(12) United States Patent
Miyata

(10) Patent No.: US 7,693,509 B2
(45) Date of Patent: Apr. 6, 2010

(54) MOBILE PHONE, INCOMING CALL NOTIFICATION METHOD, AND INCOMING CALL NOTIFICATION PROGRAM

(75) Inventor: Katsuya Miyata, Yokohama (JP)

(73) Assignee: Casio Hitachi Mobile Communications Co., Ltd., Tokyo (JP)

( * ) Notice: Subject to any disclaimer, the term of this patent is extended or adjusted under 35 U.S.C. 154(b) by 986 days.

(21) Appl. No.: 11/441,712

(22) Filed: May 25, 2006

(65) Prior Publication Data

US 2007/0042801 A1 Feb. 22, 2007

(30) Foreign Application Priority Data

May 26, 2005 (JP) ............... 2005-153392

(51) Int. Cl.
  *H04M 1/663* (2006.01)
  *H04M 3/42* (2006.01)
  *H04M 1/00* (2006.01)
(52) U.S. Cl. ................. 455/414.1; 455/412.2; 455/567; 379/208.01
(58) Field of Classification Search ............... 455/414.1, 455/552.1, 553.1, 550.1, 567, 418, 132, 133, 455/136; 379/161, 168, 184, 194, 201.1, 379/208.01
See application file for complete search history.

(56) References Cited

U.S. PATENT DOCUMENTS 5,023,903 A * 6/1991 Bowen .................. 379/67.1

2004/0001581 A1 * 1/2004 Chen et al. ............. 379/208.01

FOREIGN PATENT DOCUMENTS

| JP | 09-098409   | 4/1997  |
| JP | 2001-308856 | 11/2001 |
| JP | 2003-219471 | 7/2003  |

OTHER PUBLICATIONS

3$^{rd}$ Generation Partnership Project 2 "3GPP2", CDMA2000 High Rate Broadcast-Multicast Packet Data Air Interface Specification, Mar. 2004 http://www.3gpp2.com/Public_html/specs/tsgc.cfm.
3$^{rd}$ Generation Partnership Project 2 "3GPP2", "Upper Layer (Layer 3 Signaling Standard for cdma2000 Spread Spectrum Systems, Release D", Mar. 2004, http://www.3gpp2.com/Public_html/specs/tsgc.cfm.

* cited by examiner

*Primary Examiner*—Patrick N Edouard
*Assistant Examiner*—Michael T Thier
(74) *Attorney, Agent, or Firm*—Cohen Pontani Lieberman & Pavane LLP

(57) ABSTRACT

When an incoming voice call is detected, a mobile phone 100 judges whether an application that coordinates multicast service and unicast communication is running. If the application is not running, the user is notified of incoming voice calls. On the other hand, if in an application running state, priority mode setting information 1041 is referenced and data cell priority mode is judged. If judged to be in data call priority mode, data communication is continued without notifying the user of the reception of incoming voice calls. On the other hand, if judged to be in voice call priority mode, the user is notified of incoming voice calls.

18 Claims, 6 Drawing Sheets

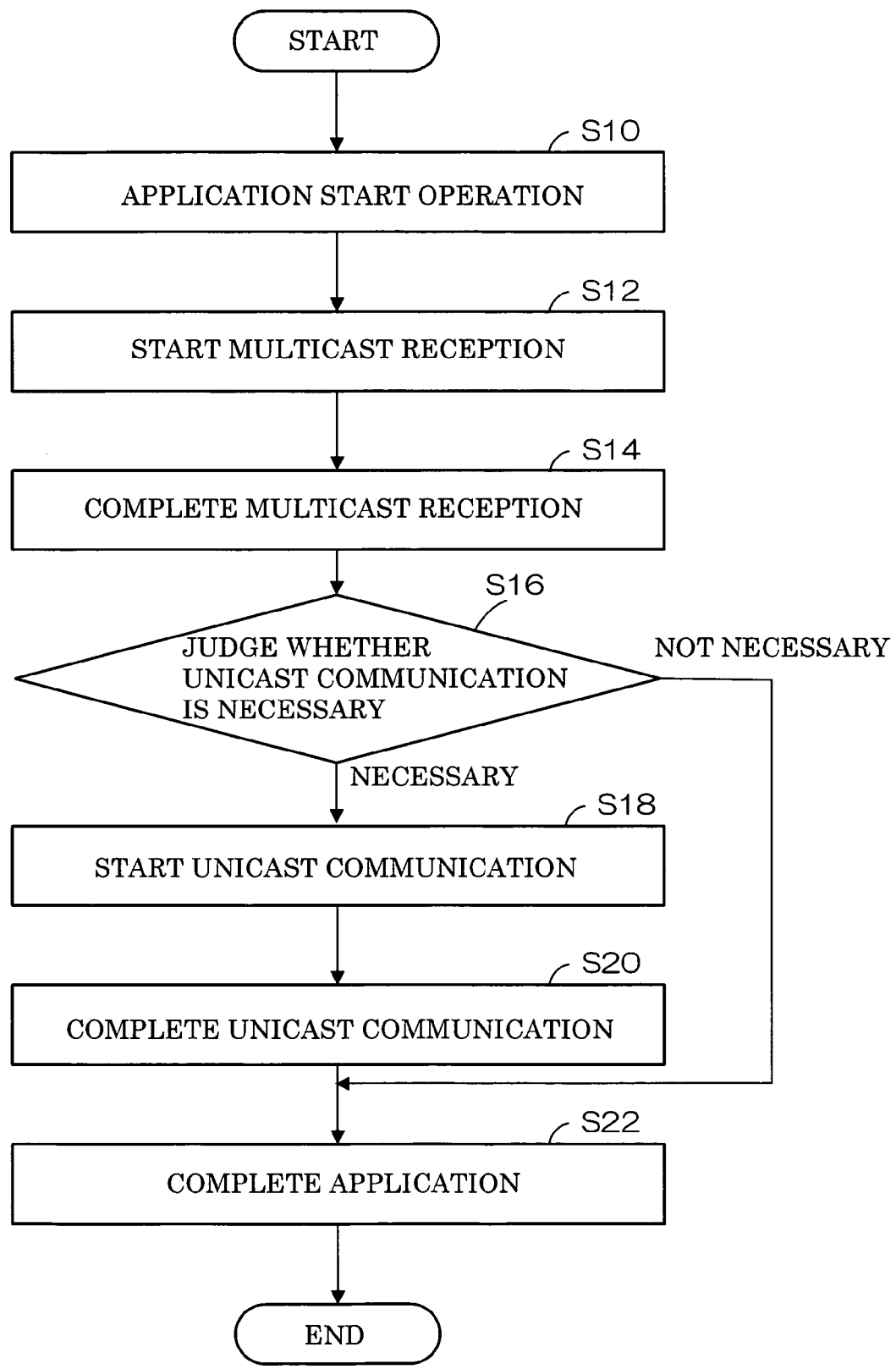

MOBILE PHONE, INCOMING CALL NOTIFICATION METHOD, AND INCOMING CALL NOTIFICATION PROGRAM

CROSS-REFERENCE TO RELATED APPLICATION

This application is based upon and claims the benefit of priority from the prior Japanese Patent Application No. 2005-153392, filed May 26, 2005, the entire contents of which is incorporated herein by reference.

BACKGROUND OF THE INVENTION

1. Field of the Invention

The present invention relates to a mobile phone, and more particularly, a mobile phones an incoming call notification method and an incoming call notification program which perform a competitive processing of data communication and voice communication.

2. Description of the Related Art

In modern cellular phones that comprise data communication functions such as e-mail transmission and reception, internet browsing and fax communication in addition to voice communication functions, many cellular phones comprise a mode (voice call priority mode) for terminating or temporarily halting data communication and for performing an incoming voice call process. In addition, they also comprise a mode (data call priority mode) for continuing data communication and giving a notification to an initiating party by a busy tone or activating a voice mail service when there is an incoming voice call during a data communication. The user himself can set the priority mode to be used. Furthermore, a method for changing the priority mode according to a connection destination is proposed (for example, refer to Japanese Laid-Open Patent Publication No. 2003-219471).

At the same time, in recent years, broadcast-type services for delivering video and audio contents, etc. to a plurality of users via a wired broadband circuit such as Asymmetric Digital Subscriber Line (ADSL) and Fiber-To-The-Home (FTTH) are becoming popular. IP multicast technology, represented by Internet Group Management Protocol (IGMP), is used in multicast services such as this.

Multicast services are not limited to wired communication and have spread to the field of wireless communication as well. Several specific methods for providing multicast services to cellular phones have been proposed (for example, refer to Japanese Laid-Open Patent Publication No. 2001-308856, Document "3GPP2 Specification C. S0005-Rev. D", and Document "3GPP2 Specification C. S0054). Each sector has a forward traffic channel provided for multicast services and all mobile devices using the services monitor this same channel.

When the multicast services are actualized in a cellular phone, usage such as interactive television can be expected. In interactive television, not only is broadcast data received, but by connection to the broadcasting station-end via a communication circuit, the purchasing of products in tie-up with shopping programs can be actualized and the viewers themselves can participate in program surveys and quiz games (for example, refer to Japanese Laid-Open Patent Publication No. Heisei 9-98409).

While considering a priority mode processing during an execution of an application for receiving a streaming broadcast by a cellular phone through a multicast service and accessing a program-affiliated site in this state, as in conventional cellular phones, if a user does not want to receive an incoming voice call during the execution of the application, the user sets the cellular phone to the data call priority mode.

When the cellular phone is set to the data call priority mode, it is preferable for the user, who recognizes a series of processes for switching from a multicast service to data communication as one application, that incoming voice calls are consistently rejected while the application is running.

However, in typical data call priority mode settings, incoming voice calls are rejected only during data communication. Therefore, this is problematic in that if an incoming voice call is received during a state where a multicast service is in use to the activation of data communication to access a desired site, the incoming voice call cannot be rejected in the conventional data call priority mode processing.

SUMMARY OF THE INVENTION

In accordance with an aspect of the present invention, there is provided a mobile phone comprising: a first communication means for performing communication by a first communication method; a second communication means for performing communication by a second communication method; a third communication means for performing communication by a third communication method; a priority communication information storage means for storing priority communication information that indicates which of the first communication means, the second communication means, or the third communication means is given priority for communication; a notification means for giving notification of an incoming call received by the first communication means; and a control means for controlling incoming call notification by the notification means based on the priority communication information, when an incoming call is received by the first communication means during a transition from communication by the second communication means to communication by the third communication means.

In accordance with another aspect of the present invention, there is provided an incoming call notification method in a mobile phone comprising a first communication section, a second communication section, a third communication section, and a notification section for giving notification of an incoming call received by the first communication section, the incoming call notification method, comprising the steps of: setting priority communication information indicating which of the first communication section, the second communication section, or third communication is given priority for communication, in advance; and controlling incoming call notification by the notification section based on the priority communication information, when an incoming call is received by the first communication section during communication by the second communication section, during communication by the third communication section, or during a transition from communication by the second communication section to communication by the third communication section.

In accordance with another aspect of the present invention, there is provided an incoming call notification method in a mobile phone comprising a first communication section, a second communication section, a third communication section, and a notification section for giving notification of an incoming call received by the first communication section, the incoming call notification method, comprising the steps of: setting a first priority communication information indicating which of said first communication section or said second communication section is given priority for communication and a second priority communication information indicating which of said first communication section or said third communication section is given priority for communication, in advance; controlling incoming call notification by the notification section based on the first priority communication information, when an incoming call is received by the first communication section during communication by the second communication section; controlling incoming call notification by the notification section based on the second priority communication information, when an incoming call is received by the first communication section during communication by the third communication section; and controlling incoming call notification by the notification section based on the first priority communication information, when an incoming call is received by the first communication section during a transition from communication by the second communication section to communication by the third communication section.

According to the present invention, there is an advantage is that the user can select whether to continue an application processing without receiving notification of a reception of an incoming voice call or to receive notification of the incoming voice call.

The above and further novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 3 is a flowchart explaining a processing operation of an application that coordinates multicast service and unicast data communication according to the first embodiment;

DETAILED DESCRIPTION OF THE PREFERRED EMBODIMENTS

The present invention will hereinafter be described in detail with reference to the preferred embodiments shown in the accompanying drawings.

A. First Embodiment

A-1. Configuration of the First Embodiment

Figure 1:
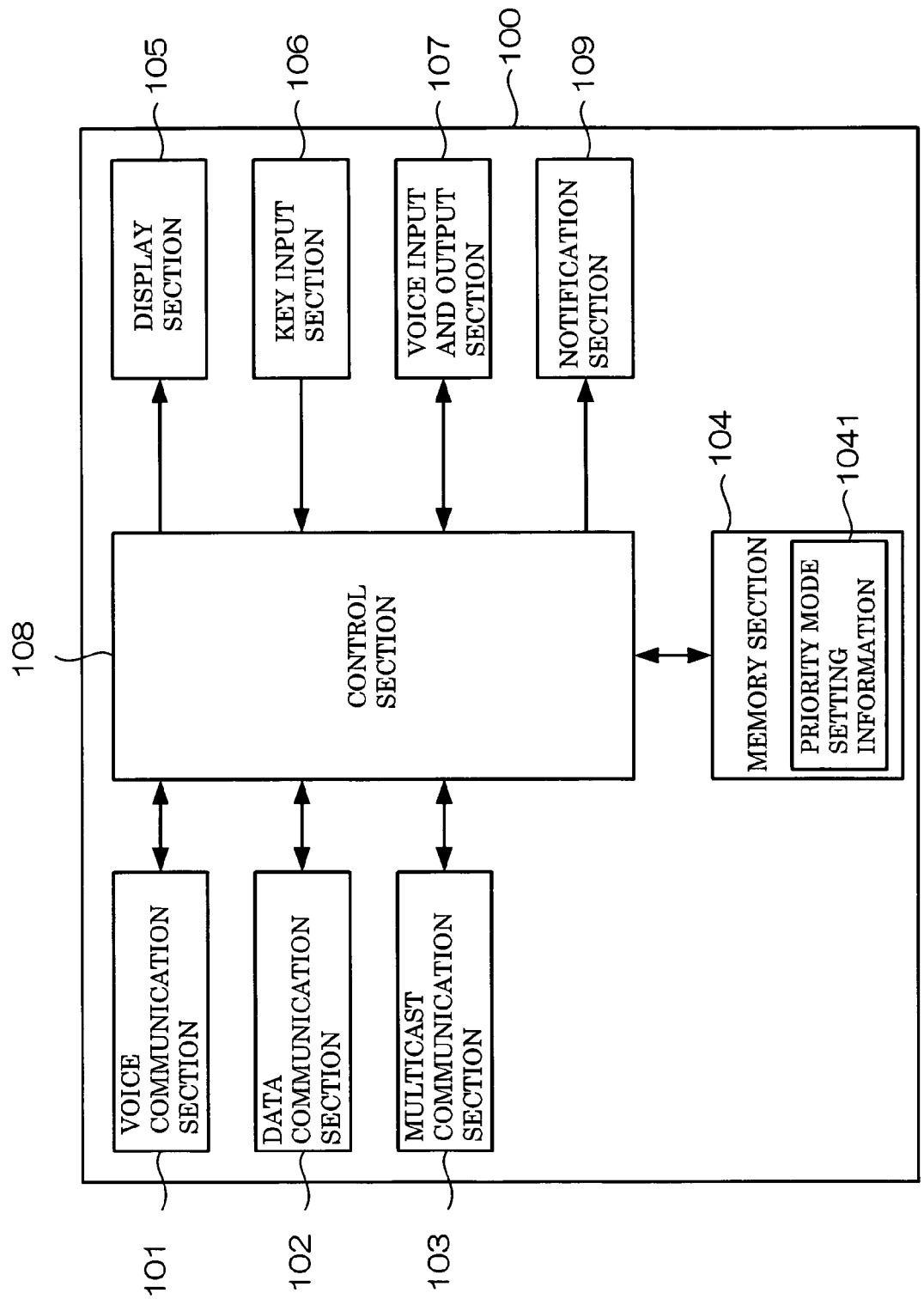
FIG. 1 is a block diagram showing a configuration of a mobile phone according to the first embodiment of the present invention.

FIG. 1 is a block diagram showing a configuration of a mobile phone according to the first embodiment of the present invention. In this diagram, a mobile phone 100 comprises a voice communication section 101, a data communication section 102, a multicast communication section 103, a memory section 104, a display section 105, a key input section 106, a voice input and output section 107, a control section 108, and a notification section 109.

The voice communication section 101 performs voice communication via a wireless communication circuit. The data communication section 102 performs data communication such as mail and internet browsing. The multicast communication section 103 performs reception of multicast contents via a wireless link and transmission and reception of control messages for multicast service use. Specifically, the multicast communication section 103 receives a multicast service parameters message transmitted by a base station and acquires information necessary for multicast service use. The multicast communication section 103 monitors a multicast channel, of which notification was given in the multicast service parameters message, according to the transmission conditions of the channel and receives multicast contents. Furthermore, the multicast communication section 103 transmits control information, such as a multicast content delivery start request or a multicast content delivery termination notification, to the base station.

The voice communication section 101, data communication section 102, and multicast communication section 103 all comprise a wireless signal transmission and reception means and a modulation means and a demodulation means for performing the modulation and demodulation of transmitted and received data. In addition, although each communication section is a separate constituent element herein, the mobile phone 100 can be configured such that a common transmission and reception means and modulation/demodulation means are shared and each communication function is realized by a communication control program.

The memory section 104 stores programs, audio, video, mail, internet sites, and other user data. The memory section 104 can be either a memory built into the mobile phone 100 or an external memory such as a removable memory card. The display section 105 is a display screen, such as a liquid crystal display, that displays mail, internet sites, basic operation screens, etc. In addition, a plurality of display screens, such as a main screen and a sub screen, can be provided.

The key input section 106 receives input from a user by a numeric keypad, function keys, a touch panel, voice input, etc. The voice input and output section 107 comprises a voice input section such as a microphone for converting inputted voice into signals and a voice output section, such as a speaker, for outputting voice. The control section 108 controls the entire mobile phone, namely the voice communication section 101, the data communication section 102, the multicast communication section 103, the memory section 104, the display section 105, the key input section 106, the voice input and output section 107, etc.

For example, when a user performs a data communication start operation via the key input section 106, the control section 108 controls the data communication section 102 based on a communication circuit establishing process program for data communication that is stored in the memory section 104 and establishes a communication circuit. When the communication circuit is established, this fact is displayed in the display section 105 and data transmission and reception is performed via the data communication section 102. The received data is stored in the memory section 104.

Priority mode setting information 1041 is stored in the memory section 104. The priority mode setting information 1041 is information for controlling operations when an incoming voice call is received during data communication and when using a multicast service. The priority mode setting information 1041 can be updated via the key input section

106. Specific operations are described hereinafter. The notification section 109 comprises an illumination means such as an LED, a sounding means such as a speaker and a vibration means such as a vibrator for vibrating the outer case and gives notification of an incoming call.

Figure 2A:
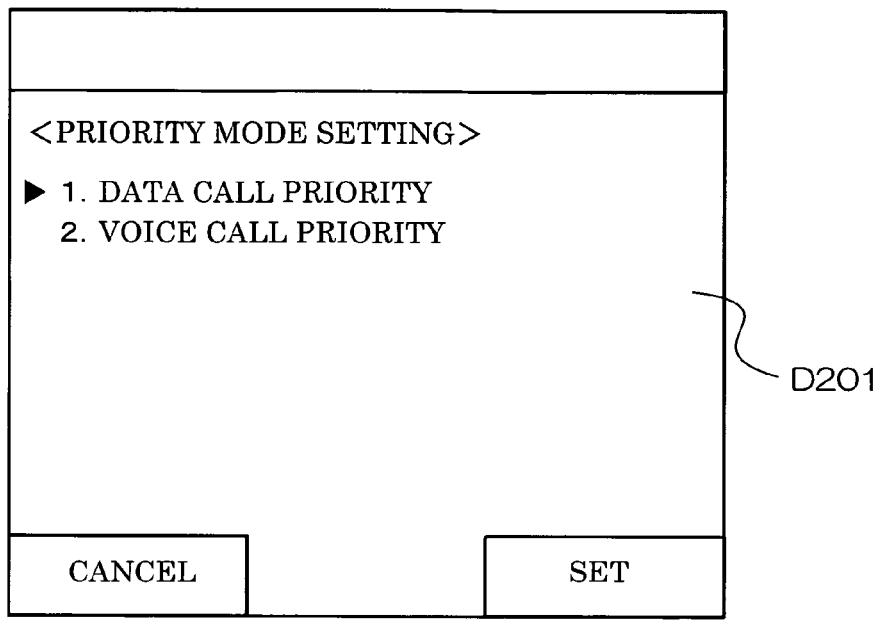
FIG. 2A and FIG. 2B are pattern diagrams showing an example of a screen transition during an update operation of priority mode setting information 1041 according to the first embodiment.
Figure 2B:
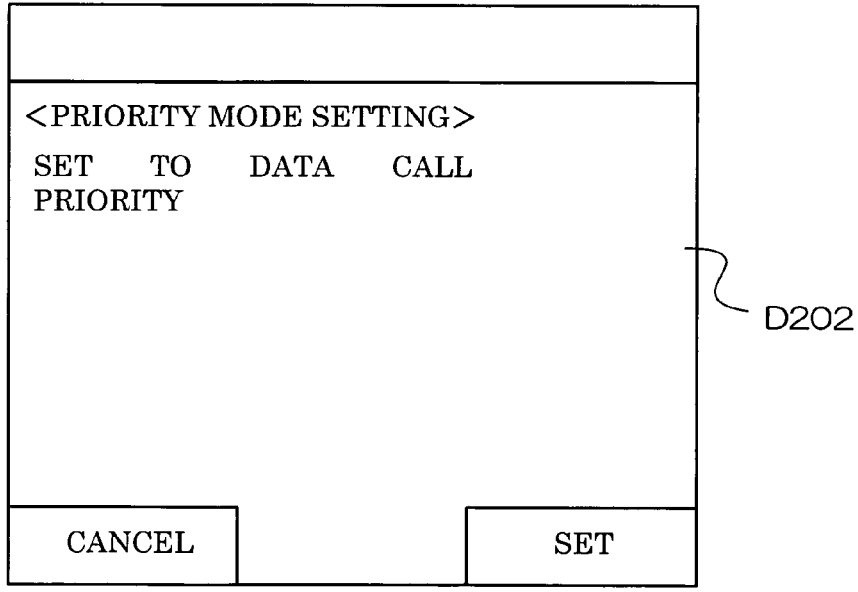

Next, FIG. 2A and FIG. 2B are pattern diagrams showing examples of a screen transition during an update operation of the priority mode setting information 1041 according to the first embodiment of the present invention. In this diagram, by selecting either "data call priority" or "voice call priority" in a "data call priority" or "voice call priority" selection screen as shown in screen D201, the selected priority mode ("data call priority" in the illustrated example) is set and stored in the priority mode setting information 1041, as shown in screen S202.

A-2. Operations of the First Embodiment

Next, operations in the mobile phone 100 according to the present invention will be described. FIG. 3 is a flowchart explaining a processing operation of an application that coordinates multicast service and unicast data communication according to the first embodiment. When a user starts an application start process via the key input section 106 (Step S10), a multicast content reception process starts (Step S12). If the received multicast content is a streaming content, a reproduction process is performed as required. If the content is other than a streaming content, the content is stored in the memory part 104. The multicast content reception is completed when a predetermined amount of time has passed since the start of the multicast content reception process, no reception data remains is detected, or the end of the reception data is detected (Step S14).

Next, a judgment process for whether or not to start a unicast communication is performed (Step S16). Examples of situations when unicast communication is judged to be necessary are when a broadcast program content is received by a multicast service and a user operation is performed to connect to a link stated within the received content, and when a configuration is made such that a connection is automatically made to a predetermined link after a reception of contents by a multicast service is completed.

In addition, situations when a sequence number attachment processing, an error detection reference number attachment processing, etc. are performed in a server or a wireless base station in advance and connection is made automatically to a predetermined link only when a content reception by the multicast service has been successfully completed, and alternately, when connection is automatically made to a predetermined link only if the content reception by the multicast service could not be successfully completed, can be considered.

When judged that unicast communication is unnecessary, the application is completed (Step S22). On the other hand, when judged that unicast communication is necessary, a unicast communication to a predetermined connection destination starts (Step S18). Then, when no data to be received remains, the unicast communication is completed (Step S20) and the application is completed (Step S22).

The data call priority mode processing according to conventional technology rejects incoming voice calls during data communication. Therefore, in an application performing a process such as that described above, incoming voice calls are received during the switching process from multicast content reception, during which data communication is not performed, to unicast communication (between Step S14 and Step S18), even when set to data call priority mode. As a result, the series of application processing is interrupted or fails. This does not fit the intentions of the user who performed the priority mode setting.

Figure 4:
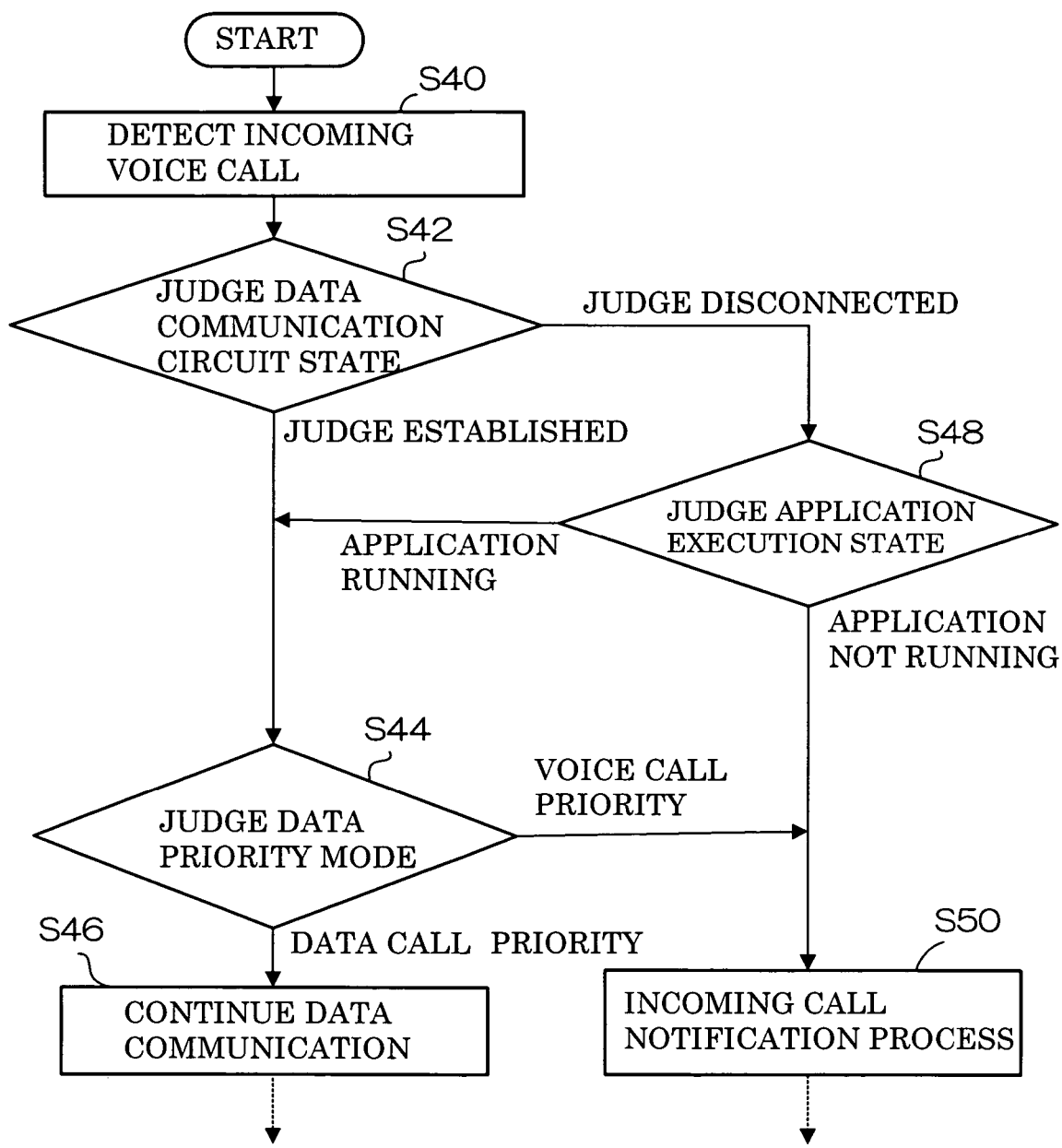
FIG. 4 is a flowchart explaining an operation when an incoming voice call is received by a mobile phone 100 according to the first embodiment.

Next, FIG. 4 is a flowchart explaining an operation when an incoming voice call is received by the mobile phone 100 according to the first embodiment. When a reception of an incoming voice call is detected (Step S40), the mobile phone 100 performs a judgment processing for whether a data communication circuit is established or disconnected (Step S42). Specifically, a status variable that is set to "circuit established state" when a data communication circuit is established and is set to "circuit disconnected state" when the data communication circuit is disconnected is provided and referenced.

Here, when judged to be in a data communication circuit established state, a data call priority mode judgment processing is performed (Step S44). This judgment processing references the priority mode setting information 1041. When judged to be in data call priority mode, data communication is continued (Step S46). At this time, incoming voice calls are ignored or a call-termination (incoming call rejection) process is performed and the user is not notified of the reception of incoming voice calls. On the other hand, when judged to be in voice call priority mode, the user is notified of the reception of incoming calls by the notification section 109 (Step S50). At this time, data communication can be terminated or continued.

When judged to be in a state where data communication circuit is not established, a judgment processing for whether the application that coordinates multicast service and unicast communication as shown in FIG. 3 is running or not running is performed (Step S48). As a specific example of this judgment processing, a status variable that is set to "application running state" when this application is running and is set to "application not running state" when the application is completed is provided and referenced.

Here, when judged that the application is not running, the user is notified of incoming voice calls by the notification section 109 (Step S50). On the other hand, when judged to be in an application running state, the data call priority mode judgment processing is performed (Step S44). If judged to be in data call priority mode, the data communication is continued without notifying the user of the reception of incoming voice calls (Step S46). On the other hand, if judged to be in voice call priority mode, the user is notified of the reception of incoming voice calls (Step S50).

Although the judgment processes in Steps S42 and S48 are separate in the first embodiment, they can be performed by one judgment process.

According to the foregoing processes, whether to continue the processing of an application that coordinates multicast service and unicast communication such as that shown in FIG. 3 without giving notification of incoming voice calls or to give notification of incoming voice calls can be selected according to the user's intent, even during the switching process from multicast content reception to unicast communication when an incoming voice call is received while running the application.

Although an application for performing unicast communication after multicast content reception is explained in the first embodiment, this can be similarly applied to an application for performing multicast content reception after unicast communication in the reverse order. In addition, this can be similarly applied to not only to an application that coordinates multicast content reception and unicast communication but also an application that performs a plurality of multicast content receptions successively and an application that performs a plurality of unicast communication successively.

In these cases as well, whether to continue the application processing without giving notification of incoming voice calls or to give notification of incoming voice calls can be selected according to the user's intent, even during the switching process of a communication method when an incoming voice call is received while running the application.

B. Second Embodiment

Next, a second embodiment of the present invention will be explained.

Figure 5:
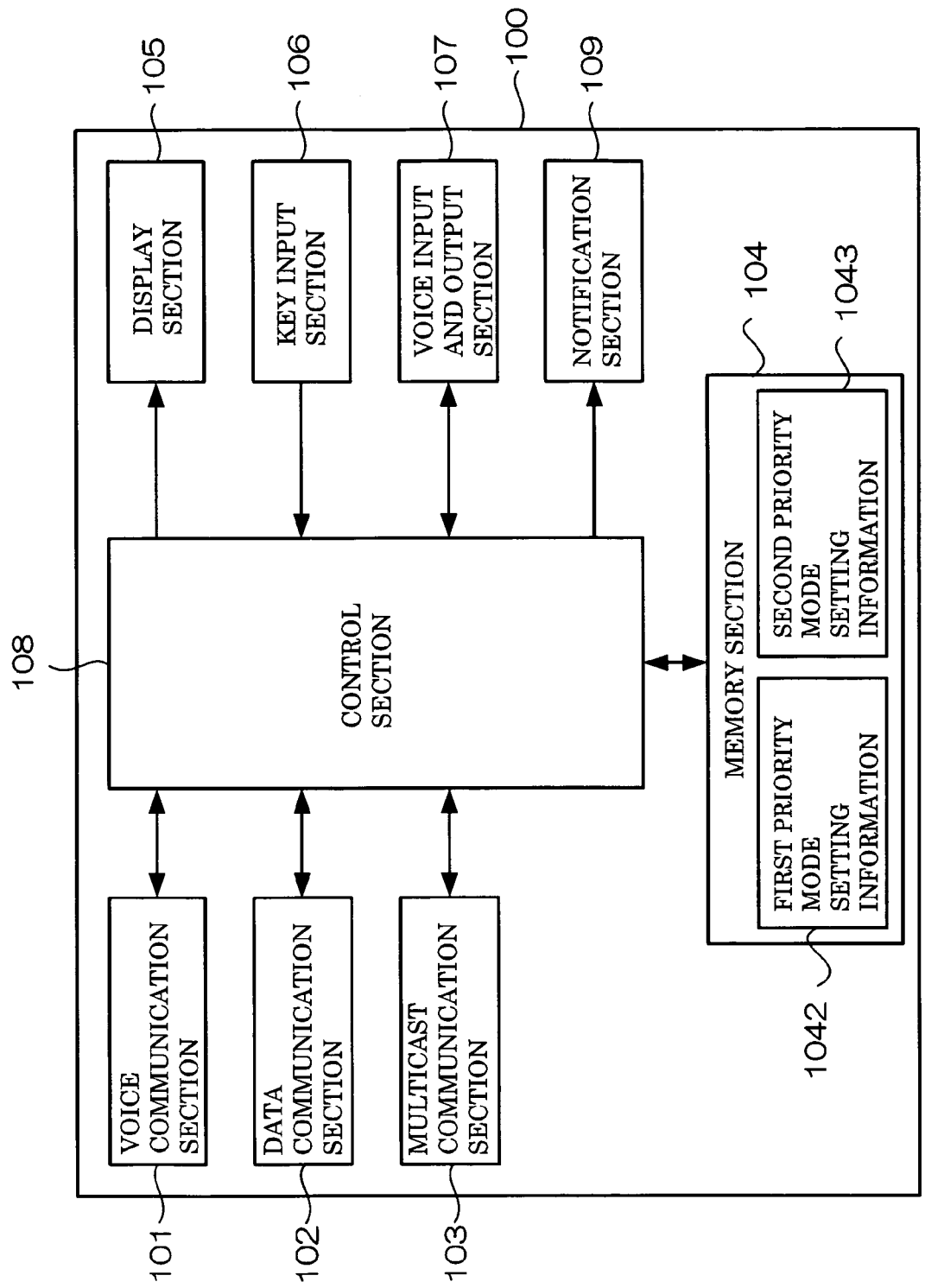
FIG. 5 is a block diagram showing a configuration of the mobile phone 100 according to the second embodiment of the present invention.

FIG. 5 is a block diagram showing a configuration of the mobile phone 100 according to the second embodiment. Components corresponding to those in FIG. 1 are given the same reference numbers and explanations thereof are omitted. In the diagram, first priority mode setting information 1402 and second priority mode setting information 1043 are stored in the memory section 104 in place of the priority mode setting information 1041 in the first embodiment.

The first priority mode setting information 1042 is information for controlling an operation when an incoming voice call is received during a unicast data communication. The second priority mode setting information 1043 is information for controlling an operation when an incoming call is received during a multicast content reception. The first priority mode setting information 1042 and the second priority mode setting information 1043 can be updated via the key input section 106. The updating procedure is the same as the updating procedure for the priority setting mode information 1041.

Figure 6:
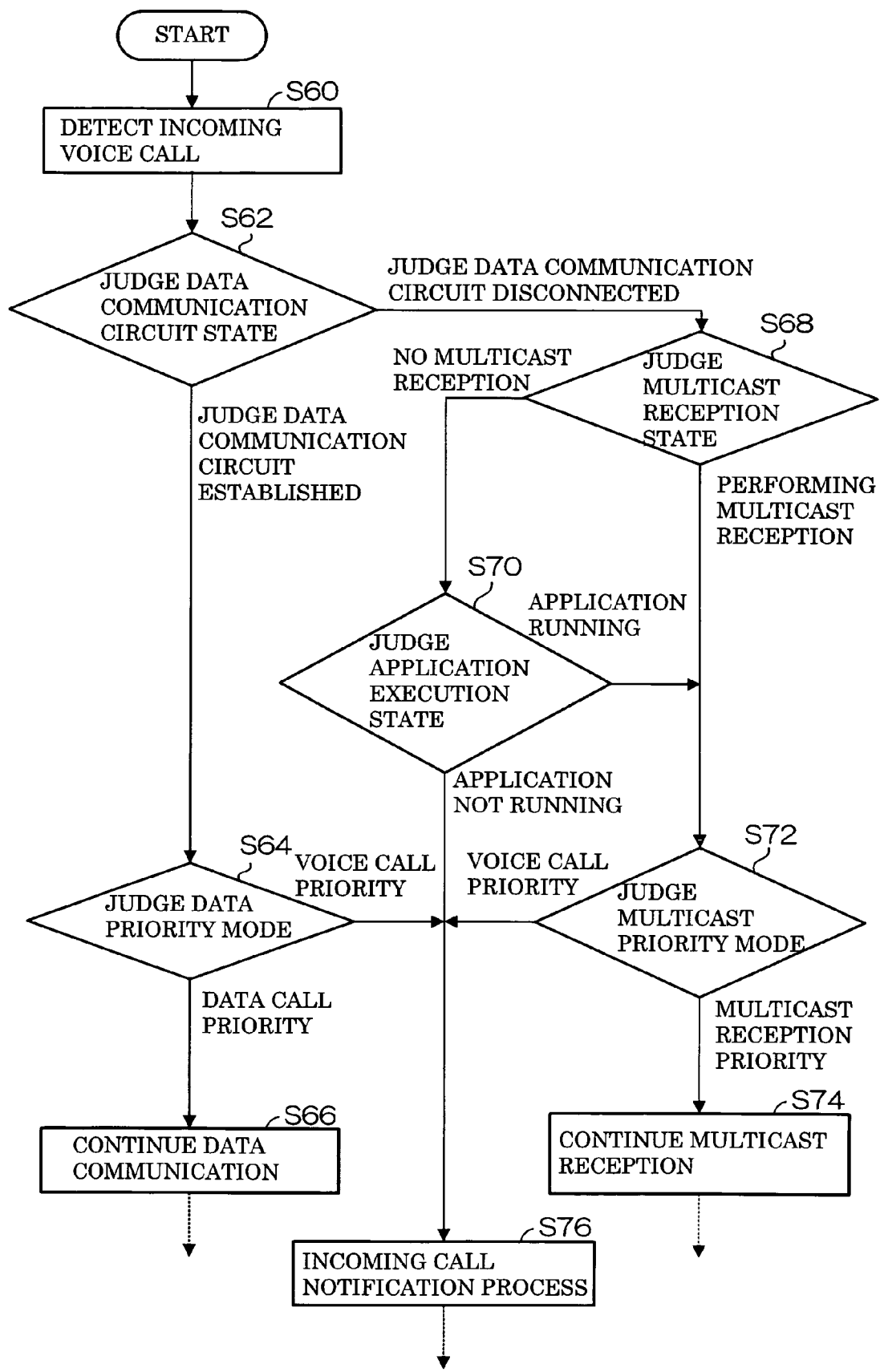
FIG. 6 is a flowchart explaining an operation when an incoming voice call is received by the mobile phone 100 according to the second embodiment.

FIG. 6 is a flowchart explaining an operation when an incoming voice call is received by the mobile phone 100 according to the second embodiment. When an incoming voice call is detected (Step S60), the mobile phone 100 performs a judgment processing for whether the data communication circuit is established or not disconnected (Step S62).

Here, when judged to be in a data communication circuit established state, a data call priority mode judgment processing is performed (Step S64). This judgment processing references the first priority mode setting information 1042. When judged to be in data call priority mode, data communication is continued (Step S66). At this time, incoming voice calls are ignored or a call-termination (incoming call rejection) process is performed and the user is not notified of the reception of incoming voice calls. On the other hand, when judged to be in voice call priority mode, the user is notified of the reception of incoming calls by the notification section 109 (Step S76). At this time, data communication can be terminated or continued.

At the same time, if judged at Step S62 to be in a state where data communication circuit is not established, a judgment processing for whether a multicast service is in use is performed (Step S68). Specifically, a status variable that is set to "multicast receiving state" when the multicast service starts and is set to "multicast non-receiving state" when the multicast service is completed is provided and referenced.

If judged that the multicast service is not in use, a judgment processing for whether the application that coordinates multicast service and unicast communication is running or not running such as that shown in FIG. 3 is performed (Step S70). Although the judgment processes in Steps S62, S68, and S70 are separate in the second embodiment, they can be performed by one or two judgment processes. If judged that the application is not running, the user is notified of incoming calls by the notification section 109 (Step S76).

On the other hand, when judged that the multicast service is in use at Step S68 or that the application is running at Step S70, a multicast priority mode judgment processing is performed (Step S72). This judgment processing references the second priority mode setting information 1043. When judged to be in multicast priority mode, the multicast content reception is continued (Step S74). At this time, incoming voice calls are ignored or a call-termination (incoming call rejection) process is performed and the user is not notified of the reception of incoming voice calls. On the other hand, when judged to be in voice call priority mode, the user is notified of the reception of incoming calls by the notification section 109 (Step S76). At this time, data communication can be terminated or continued.

According to the foregoing processes, whether to continue the processing of an application that coordinates multicast service and unicast communication such as that shown in FIG. 3 without giving notification of incoming voice calls or to give notification of incoming voice calls can be selected according to the user's intent, even during the switching process from multicast content reception to unicast communication when an incoming voice call is received while running the application.

Although an application for performing unicast communication after multicast content reception is explained in the second embodiment, this can be similarly applied to an application for performing multicast content reception after unicast communication in the reverse order. In addition, this can be similarly applied to not only to an application that coordinates multicast content reception and unicast communication but also an application that performs a plurality of multicast content receptions successively and an application that performs a plurality of unicast communication successively. Furthermore, although incoming voice calls during the switching process from multicast content reception to unicast communication are processed in the same way as the incoming voice calls during multicast content reception in the second embodiment, the incoming voice calls can be processed in the same way as the incoming voice calls during unicast communication.

In these cases as well, whether to continue the application processing without giving notification of incoming voice calls or to give notification of incoming voice calls can be selected according to the user's intent, even during the switching process of a communication method when an incoming voice call is received while running the application. Furthermore, the priority mode setting during the use of multicast services and the priority mode setting during unicast communication can be configured separately.

Additionally, although the incoming call notification program in a mobile phone which is a preferred embodiment of the present invention and is processed in the mobile phone memory (for example, ROM, etc.), this program is stored on a recording medium. In the case of performing, such as manufacture, sale, etc., only the program itself must be protected. In such a situation, protection of the program becomes the form of the recording medium which stores the incoming call notification program.

While the present invention has been described with reference to the preferred embodiments, it is intended that the invention be not limited by any of the details of the description therein but includes all the embodiments which fall within the scope of the appended claims.

What is claimed is:
1. A mobile phone comprising:
a first communication means for performing communication by a first communication method;
a second communication means for performing communication by a second communication method;

a third communication means for performing communication by a third communication method;
a priority communication information storage means for storing priority communication information that indicates which of the first communication means, the second communication means, or the third communication means is given priority for communication;
a notification means for giving notification of an incoming call received by the first communication means; and
a control means for controlling incoming call notification by the notification means based on the priority communication information, when an incoming call is received by the first communication means during a transition from communication by the second communication means to communication by the third communication means.

2. The mobile phone according to claim 1, wherein said control means controls incoming call notification by said notification means based on said priority communication information, when an incoming call is received by said first communication means during communication by the second communication means or communication by the third communication means.

3. The mobile phone according to claim 1, wherein said control means executes incoming call notification by said notification means, when said priority communication information indicates said first communication means is set as the most prioritized communication means.

4. The mobile phone according to claim 1, comprising a setting means for setting said priority communication information.

5. The mobile phone according to claim 1, wherein:
said priority communication information storage means stores a first priority communication information indicating which of said first communication means or said second communication means is given priority for communication and a second priority communication information indicating which of said first communication means or said third communication means is given priority for communication;
said control means controls incoming call notification by said notification means based on said first priority communication information of said priority communication information storage means, when an incoming call is received by said first communication means during a transition from communication by said second communication means to communication by said third communication means;
said control means controls incoming call notification by said notification means based on said first priority communication information, when an incoming call is received by said first communication means during communication by said second communication means; and
said control means controls incoming call notification by said notification means based on said second priority communication information, when an incoming call is received by said first communication means during communication by said third communication means.

6. The mobile phone according to claim 5, wherein said control means controls incoming call notification by said notification means based on a second priority communication information of said priority communication information storage means, when an incoming call is received by said first communication means during a transition from communication by said second communication means to communication by said third communication means.

7. The mobile phone according to claim 5, wherein said control means performs incoming call notification by said notification means when said first priority communication information or said second priority communication information indicates that said first communication means is set as the most prioritized communication means.

8. The mobile phone according to claim 5, comprising a first setting means for setting said first priority communication information.

9. The mobile phone according to claim 5, comprising a second setting means for setting said second priority communication information.

10. The mobile phone according to claim 1, wherein:
said first communication means performs voice communication;
said second communication means performs multicast content communication; and
said third communication means performs data communication.

11. An incoming call notification method in a mobile phone comprising a first communication section, a second communication section, a third communication section, and a notification section for giving notification of an incoming call received by the first communication section, the incoming call notification method, comprising the steps of:
setting priority communication information indicating which of the first communication section, the second communication section, or third communication is given priority for communication, in advance; and
controlling incoming call notification by the notification section based on the priority communication information, when an incoming call is received by the first communication section during a transition from communication by the second communication section to communication by the third communication section.

12. The incoming call notification method according to claim 11, the method further comprising the step of:
controlling incoming call notification by the notification section based on the priority communication information, when an incoming call is received by the first communication section during communication by the second communication section or communication by the third communication section.

13. An incoming call notification method in a mobile phone comprising a first communication section, a second communication section, a third communication section, and a notification section for giving notification of an incoming call received by the first communication section, the incoming call notification method, comprising the steps of:
setting a first priority communication information indicating which of said first communication section or said second communication section is given priority for communication and a second priority communication information indicating which of said first communication section or said third communication section is given priority for communication, in advance;
controlling incoming call notification by the notification section based on the first priority communication information, when an incoming call is received by the first communication section during communication by the second communication section;
controlling incoming call notification by the notification section based on the second priority communication information, when an incoming call is received by the first communication section during communication by the third communication section; and controlling incoming call notification by the notification section based on the first priority communication information, when an incoming call is received by the first communication section during a transition from communication by the second communication section to communication by the third communication section.

14. The incoming notification method according to claim 13, the method includes the step of:
controlling incoming call notification by the notification section based on the second priority communication information, when an incoming call is received by the first communication section during a transition from communication by the second communication section to communication by the third communication section.

15. A processor-readable storage medium having an incoming call notification program stored thereon that is executable by a processor in a mobile phone comprising a first communication section, a second communication section, a third communication section, and a notification section for giving notification of an incoming call received by the first communication section, the incoming call notification program comprising:
a priority communication information setting step of setting priority communication information indicating which of the first communication section, the second communication section, or the third communication section is given priority for communication, in advance;
a incoming call detection step of detecting an incoming call received by the first communication section;
a first judgment step of judging whether communication by the second communication section is being performed;
a second judgment step of judging whether communication by the third communication section is being performed;
a third judgment step of judging whether a transition from communication by the second communication section to communication by the third communication section is being made; and
an incoming call notification step of controlling incoming call notification by the notification section based on the priority communication information, when an incoming call is received by the first communication section during a transition from communication by the second communication section to communication by the third communication section.

16. The processor-readable storage medium according to claim 15, the incoming call notification program further comprising:
another incoming call notification step of controlling incoming call notification by the notification section based on the priority communication information, when an incoming call is received by the first communication section during communication by the second communication section or communication by the third communication section.

17. A processor-readable storage medium having an incoming call notification program stored thereon that is executable by a processor in a mobile phone comprising a first communication section, a second communication section, a third communication section, and a notification section for giving notification of an incoming call received by the first communication section, the incoming call notification program comprising:
a priority communication information setting step of setting a first priority communication information indicating which of the first communication section or the second communication section is given priority for communication, and a second priority communication information indicating which of the first communication section or the third communication section is given priority for communication, in advance;
a incoming call detection step of detecting an incoming call received by the first communication section;
a first judgment step of judging whether communication by the second communication section is being performed;
a second judgment step of judging whether communication by the third communication section is being performed;
a third judgment step of judging whether a transition from communication by the second communication section to communication by the third communication section is being made;
a first incoming call notification step of controlling incoming call notification by the notification section based on the first priority communication information, when an incoming call is received by the first communication section during communication by the second communication section;
a second incoming call notification step of controlling incoming call notification by the notification section based on the second priority communication information when an incoming call is received by the first communication section during communication by the third communication section; and
a third incoming call notification step of controlling incoming call notification by the notification section based on the first priority communication information when an incoming call is received by the first communication section during a transition from communication by the second communication section to communication by the third communication section.

18. The processor-readable storage medium according to claim 17, wherein said third incoming call notification step controls incoming call notification by said notification section based on said second priority communication information when an incoming call is received by said first communication section during a transition from communication by said second communication section to communication by said third communication section.

* * * * *